Figure 1:
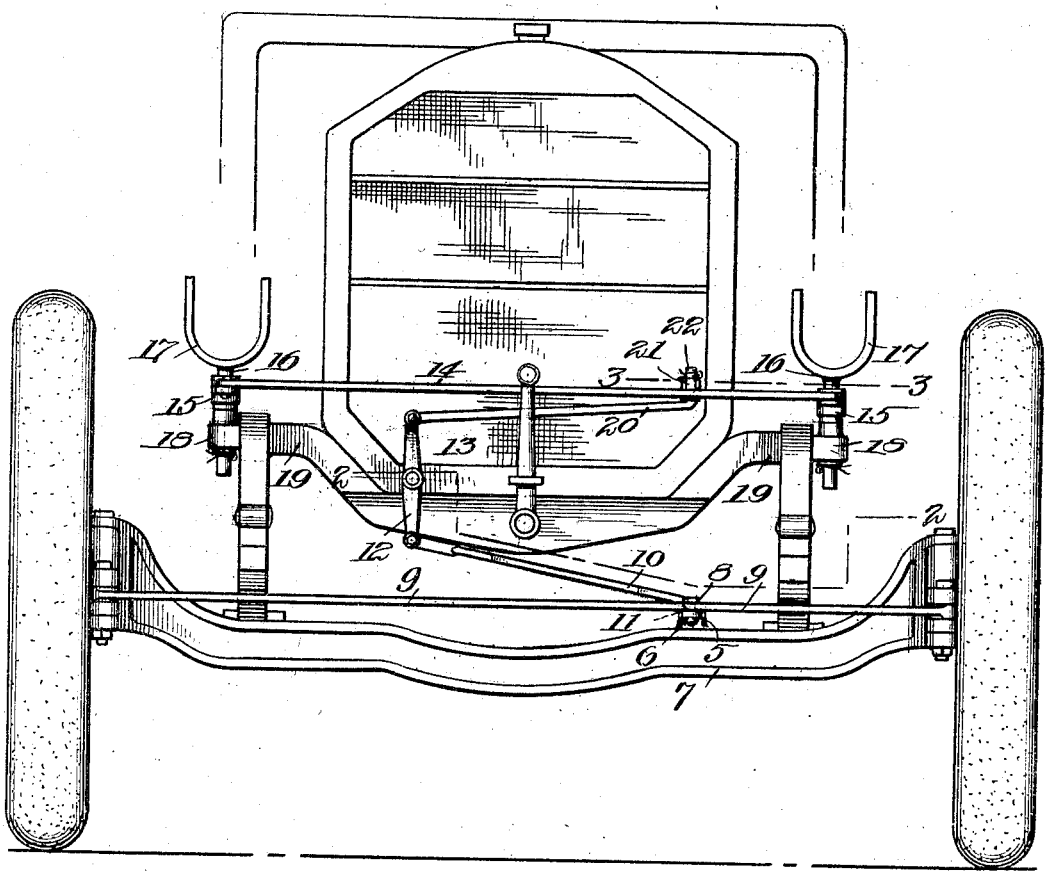

P. N. SQUIRES.
HEADLIGHT ADJUSTER FOR MOTOR VEHICLES.
APPLICATION FILED AUG. 5, 191

1,032,309.

Patented July 9, 1912.
2 SHEETS—SHEET 1.

Witnesses
F.C. Barry

Inventor
Pembroke N. Squires

By Victor J. Evans
Attorney

P. N. SQUIRES.
HEADLIGHT ADJUSTER FOR MOTOR VEHICLES.
APPLICATION FILED AUG. 5, 1911.
1,032,309.
Patented July 9, 1912.
2 SHEETS—SHEET 2.
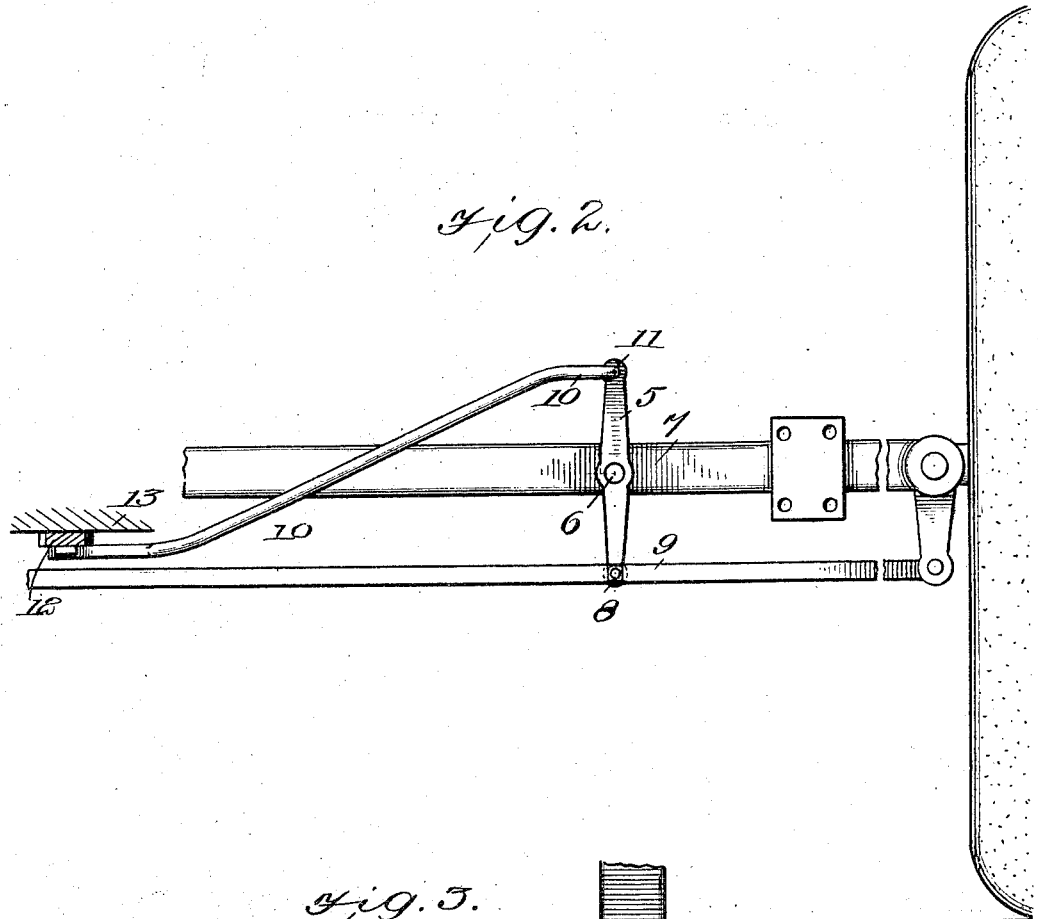
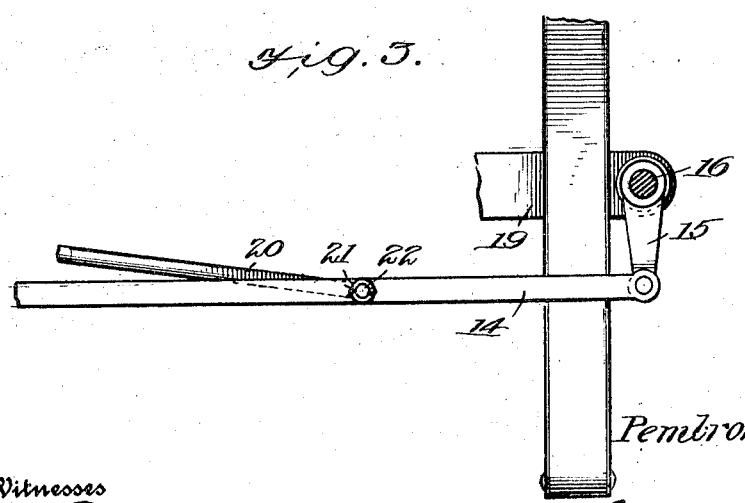
Inventor
Pembroke N. Squires
Witnesses
By Victor J. Evans
Attorney

UNITED STATES PATENT OFFICE.

PEMBROKE N. SQUIRES, OF CANON CITY, COLORADO.

HEADLIGHT-ADJUSTER FOR MOTOR-VEHICLES.

1,032,309.　　　　Specification of Letters Patent.　　Patented July 9, 1912.

Application filed August 5, 1911. Serial No. 642,498.

*To all whom it may concern:*

Be it known that I, PEMBROKE N. SQUIRES, a citizen of the United States, residing at Canon City, in the county of Fremont and State of Colorado, have invented new and useful Improvements in Headlight-Adjusters for Motor-Vehicles, of which the following is a specification.

The general object of the invention is to permit of the lamps of a motor vehicle turning in unison with the front or steering wheels, whereby, to reflect the light at an angle to the body of the vehicle when rounding curves.

Other objects will appear and be better understood from the following description taken in connection with the accompanying drawings, in which, Figure 1 is a front elevation of the device in operative position. Fig. 2 is a detail plan approximately on the line 2—2 of Fig. 1. Fig. 3 is a sectional detail approximately on the line 3—3 of Fig. 1.

The lever 5 is fulcrumed at its intermediate portion as shown at 6 on the front axle 7 and is pivotally connected at one end as shown at 8 to the tie rod 9. The link 10 has a downturned end portion 11 which is received by a suitable opening in the crank 5 and is pivotally connected at its opposite end with the rock arm 12 pivoted to the radiator frame 13 or other suitable portion of the vehicle. The connecting rod 14 is pivotally connected at its ends to crank arms 15 extending radially from the shanks 16 of the lamp brackets 17, the said shanks 16 being journaled in boxings 18 carried by the brackets 19 which are connected to any suitable portion of the motor vehicle such as the radiator frame 13. The arm 20 is adapted at one end to be fixedly secured to the connecting rod 14, any preferred construction being employed to effect this connection such as by recessing the arm 20 so as to receive the connecting rod 14 and securing the same in the recess portion by a clamp strip 21, connected to the rod in any preferred manner such as by screws 22. The lower end portion of the arm 20 connects to the upper end of the rock arm 12.

From the foregoing it will be seen that when the tie rod is moved in the direction of its length, which is done in the ordinary manner by the movable part of the front axle to which it is connected, the lever 5 is moved and the connecting rod 14 is also moved through its connections with the tie rod. This movement of the connecting rod has the effect of turning the lamp brackets and the lamps connected thereto in the same direction of the front wheels.

Although I have shown and described one embodiment of my invention it is to be understood that I am not to be limited to the specific structure nor to the particular arrangement of the parts herein shown and claimed since it will be seen that various changes will be made, in the scope of the appended claim, without departing from the spirit or sacrificing any of the advantages.

What I claim as new is:

In a motor vehicle, the combination with the steering apparatus, the front axle and rotatable lamp supports connected to the vehicle; of a lever connected at its middle portion to the front axle and at one end to the steering apparatus, a rock arm connected to the body of the vehicle, a link connecting the other end of the lever with one end of the rock arm, a connecting rod pivotally connected at its opposite ends to the lamp supports and a rod secured at one end to the connecting rod and pivotally connected at its opposite end to the other end of the rock arm.

In testimony whereof I affix my signature in presence of two witnesses.

PEMBROKE N. SQUIRES.

Witnesses:
　F. L. BUNTEN,
　R. G. NESBIT.

Copies of this patent may be obtained for five cents each, by addressing the "Commissioner of Patents, Washington, D. C."